UNITED STATES PATENT OFFICE.

OREON S. DAVIS, OF ANAHEIM, CALIFORNIA, ASSIGNOR OF TWO-THIRDS TO WILLIAM H. SPAKE AND OCTAVE A. LAGMAN, OF ANAHEIM, CALIFORNIA.

PROCESS OF MAKING BRICK.

No. 924,745.  Specification of Letters Patent.  Patented June 15, 1909.

Application filed February 23, 1907. Serial No. 358,893.

*To all whom it may concern:*

Be it known that I, OREON S. DAVIS, a citizen of the United States, residing at Anaheim, in the county of Orange and State of California, have invented a new and useful Process of Making Brick, of which the following is a specification.

This invention relates to the manufacture of building blocks, bricks, tiles and similar articles, and has for its principal object to provide an improved method of manufacturing an article of this type which will not be affected by moisture or exposure to the sun.

In carrying out the invention, the articles, such as blocks, bricks, tiles, pipes, or the like, are first molded and pressed from clay or earth having enough natural cement or bonding material in it to cause the particles of earth to adhere. The article is then dried in the sun or in a suitable kiln without burning, until all of the moisture has been driven off. The articles are then immersed in a bath of liquid asphaltum, the latter being heated to a temperature of from 212 to 700 degrees Fahrenheit, the articles being allowed to remain in the bath until the asphaltum has penetrated to any desired depth, it being found in practice that when the asphaltum has penetrated to the extent of about one-half inch that a smooth, waterproof surface will be formed. The articles are then removed from the asphaltum bath and placed in an oven heated to a temperature corresponding to that of the liquid asphaltum, that is to say, from 212 to 700 degrees Fahrenheit, to prevent cracking, which would ensue if they were transferred to a comparatively cool oven, the articles being allowed to remain in the oven and the asphaltum maintained in more or less liquid form so that it may penetrate farther into the block of material and become more fully absorbed thereby. After exposure for a short period to the heat of the oven, it is found that the surface of the blocks or other articles presents a dead or dull black appearance, and the temperature of the oven is gradually reduced to a point where the articles can be removed with safety.

The bricks or other articles so made are cheap, durable and moisture proof, and are found of considerable value in places where they must be exposed to the heat of the sun.

I claim:—

The herein described method of manufacturing bricks, blocks, and the like, which consists in first forming and pressing the article from clay or earth, drying it to expel moisture, but without baking, immersing it in a bath of asphaltum having a temperature of from 212° to 700° F. to permit penetration of the article by the asphaltum to a depth of about one-half an inch, then removing it from the bath and subjecting it to a gradually decreasing dry temperature having an initial degree approximating that of the melted asphaltum to cause the latter further to strike into the article, and finally removing the article.

In testimony that I claim the foregoing as my own, I have hereto affixed my signature in the presence of two witnesses.

OREON S. DAVIS.

Witnesses:
E. W. McCOLLUM,
L. S. EVANS.